(12) United States Patent
Erlandsson

(10) Patent No.: US 9,835,079 B2
(45) Date of Patent: Dec. 5, 2017

(54) ENGINE CONTROL METHOD

(75) Inventor: Olof Erlandsson, Bräkne-Hoby (SE)

(73) Assignee: ALVAR ENGINE AB, Huddinge (SE)

( * ) Notice: Subject to any disclaimer, the term of this patent is extended or adjusted under 35 U.S.C. 154(b) by 993 days.

(21) Appl. No.: 13/376,796

(22) PCT Filed: Jun. 10, 2009

(86) PCT No.: PCT/SE2009/000295
§ 371 (c)(1),
(2), (4) Date: Dec. 7, 2011

(87) PCT Pub. No.: WO2010/143998
PCT Pub. Date: Dec. 16, 2010

(65) Prior Publication Data
US 2012/0078491 A1    Mar. 29, 2012

(51) Int. Cl.
*F02B 1/14*    (2006.01)
*F02B 1/02*    (2006.01)
(Continued)

(52) U.S. Cl.
CPC ................. *F02B 1/14* (2013.01); *F02B 1/02* (2013.01); *F02B 1/12* (2013.01); *F02B 11/00* (2013.01);
(Continued)

(58) Field of Classification Search
CPC ...... F02B 1/02; F02B 1/12; F02B 1/14; F02B 11/00; F02D 15/04; F02D 35/028; F02D 41/3041; F02D 13/0265; Y02T 10/18
(Continued)

(56) References Cited

U.S. PATENT DOCUMENTS 4,182,288 A * 1/1980 Thauer .................... F02B 19/06
123/48 A
4,856,463 A * 8/1989 Johnston .................. 123/51 BA
(Continued)

FOREIGN PATENT DOCUMENTS

EP        1688601        8/2006
JP     2004-011546       1/2004
(Continued)

OTHER PUBLICATIONS

Refernce Oda "Internal Combustion Engine" (JP Publication No. 2004-011546) Machine Tranlsation.*
(Continued)

*Primary Examiner* — Hung Q Nguyen
*Assistant Examiner* — Brian P Monahon
(74) *Attorney, Agent, or Firm* — Alston & Bird LLP

(57) ABSTRACT

The invention relates to a method for operating an internal combustion engine (1) provided with at least one working cylinder (3a-3d) each with an associated auxiliary cylinder (5a-5d), which engine (1) is operable in spark ignition and compression ignition modes. Each working cylinder (3a-3d) comprises a working piston (7a-7a) connected to a first crankshaft (9), and each auxiliary cylinder (5a-5d) comprises an auxiliary piston (10a-10d) connected to a second crankshaft (12). The first crankshaft (9) is connected to the second crankshaft (12) to drive the second crankshaft (12) at half the rotational speed of the first crankshaft (9). A device for controlling the phase angle is arranged between the first and second crankshafts. The method involves controlling the phase shift device in order to retain residual exhaust gas and increase the compression ratio. A current combustion phasing timing is determined, and the combustion phasing timing is corrected by increasing or decreasing the phase angle to achieve a desired combustion phasing timing.

18 Claims, 5 Drawing Sheets

(51) Int. Cl.
*F02B 1/12* (2006.01)
*F02B 11/00* (2006.01)
*F02D 13/02* (2006.01)
*F02D 15/04* (2006.01)
*F02D 35/02* (2006.01)
*F02D 41/30* (2006.01)

(52) U.S. Cl.
CPC ......... *F02D 13/0265* (2013.01); *F02D 15/04* (2013.01); *F02D 35/028* (2013.01); *F02D 41/3041* (2013.01); *Y02T 10/128* (2013.01); *Y02T 10/18* (2013.01)

(58) Field of Classification Search
USPC .......... 123/53.3, 53.6, 53.2, 55.2, 55.5, 55.7
See application file for complete search history.

(56) References Cited

U.S. PATENT DOCUMENTS

| | | | |
|---|---|---|---|
| 5,188,066 A | 2/1993 | Gustavsson | |
| 6,213,086 B1* | 4/2001 | Chmela | F02B 1/12 123/179.5 |
| 6,260,520 B1* | 7/2001 | Van Reatherford | F02B 1/12 123/48 A |
| 6,286,482 B1* | 9/2001 | Flynn | F02B 1/12 123/25 C |
| 6,581,551 B1 | 6/2003 | Denbratt | |
| 6,763,787 B2* | 7/2004 | Hallenstvedt et al. | 123/78 A |
| 6,915,776 B2* | 7/2005 | zur Loye | F02B 1/12 123/304 |
| 7,481,185 B1* | 1/2009 | Park | F02B 1/12 123/21 |
| 2002/0166536 A1* | 11/2002 | Hitomi | F01L 1/34 123/305 |
| 2004/0050363 A1* | 3/2004 | Yamaoka | B60W 30/1819 123/435 |
| 2005/0188955 A1* | 9/2005 | Koopmans | F02B 1/12 123/435 |
| 2006/0005788 A1* | 1/2006 | Kuo | F02B 17/005 123/21 |
| 2007/0089697 A1* | 4/2007 | Hara et al. | 123/90.15 |
| 2007/0119417 A1* | 5/2007 | Eng et al. | 123/305 |
| 2007/0215095 A1* | 9/2007 | Kakuya et al. | 123/295 |
| 2007/0272203 A1* | 11/2007 | Sloane et al. | 123/295 |
| 2008/0078358 A1* | 4/2008 | Kumano et al. | 123/406.19 |
| 2008/0147298 A1* | 6/2008 | Suda | F02D 37/02 701/103 |
| 2008/0202469 A1* | 8/2008 | Kang | F02D 35/023 123/435 |
| 2008/0221781 A1* | 9/2008 | Kang | F02D 35/023 701/106 |
| 2008/0223342 A1 | 9/2008 | Angstrom | |
| 2008/0264382 A1* | 10/2008 | Kang | 123/435 |
| 2008/0275622 A1* | 11/2008 | Strom | F02B 1/12 701/103 |
| 2009/0018756 A1* | 1/2009 | Storhok | F02D 41/0007 701/105 |
| 2009/0048761 A1* | 2/2009 | Kang | F02D 13/0219 701/103 |
| 2009/0084333 A1* | 4/2009 | Cleary et al. | 123/90.17 |
| 2009/0159022 A1* | 6/2009 | Chu | 123/52.2 |
| 2009/0164100 A1* | 6/2009 | Ostberg et al. | 701/103 |

FOREIGN PATENT DOCUMENTS

| | | | | |
|---|---|---|---|---|
| JP | 2004011546 A | * | 1/2004 | |
| WO | WO 0194766 | | 12/2001 | |
| WO | WO 0194766 A1 | * | 12/2001 | ............. F02D 15/04 |
| WO | WO 2007/010186 | | 1/2007 | |
| WO | WO 2007010186 A1 | * | 1/2007 | ............. F02B 47/08 |

OTHER PUBLICATIONS

Refernce Oda "Internal Combustion Engine" (JP Publication No. 2004-011546) Drawings.*
International Search Report dated Feb. 17, 2010, for Application No. PCT/SE2009/000295
International Preliminary Report on Patentability dated May 13, 2011, for Application No. PCT/SE2009/000295.

* cited by examiner

ENGINE CONTROL METHOD

CROSS-REFERENCE TO RELATED APPLICATIONS

This application is a national stage application, filed under 35 U.S.C. §371, of International Application No. PCT/SE2009/000295, filed Jun. 10, 2009, which is hereby incorporated by reference in its entirety.

BACKGROUND

Technical Field

The invention relates to the field of controlling an internal combustion engine with a variable compression ratio during spark ignition operation and homogeneous charge compression ignition operation.

DESCRIPTION OF RELATED ART

In an internal combustion engine (ICE) it is desirable to limit the temperature in a combustion chamber in order to minimize the formation of nitrous oxides (NOx) and/or particulate matter (PM). One way of achieving the goal of reducing the emissions from ICEs is to use homogenous and/or lean air/fuel mixtures, that is, a relatively small amount of fuel in relation to the amount of air and other constituents. Induced ignition in a single location, using e.g. a spark plug, may result in a reduced combustion stability with both cycle-to-cycle and cylinder-to-cylinder variations. Lean homogenous air/fuel mixtures will require a more forceful method of igniting the combustible mixture. One such method is homogeneous charge compression ignition (HCCI). HCCI involves compression of the mixture of fuel, air and other constituents to a point where the oxidation process of the fuel accelerates at a desired time, preferably adjacent or after top-dead-centre (TDC) after a compression stroke.

HCCI is dependent on the thermal condition of the combustible mixture after the compression stroke in the ICE and parameters having a significant influence on the ignition process require control. These parameters may influence the chemical reactions causing oxidation and initiating decomposition of the fuel. Examples of such parameters are the local pressure, the local temperature and the quantity and composition of the gaseous mixture of air, fuel and other constituents. The said other constituents are mainly retained exhaust gases. The exhaust gases may be retained in the combustion chamber by using a negative valve overlap during the exhaust stroke and/or the intake stroke or by returning the exhaust gas from the exhaust manifold using exhaust gas recirculation (EGR).

The above parameters are in turn dependent on a number of additional parameters and conditions inside and outside the combustion chamber. Inside the combustion chamber the local condition during and after the compression stroke is influenced by gas flow processes (turbulence, gas mixing), heat conduction processes (gas-to-gas, gas-to-wall) and possible evaporation processes (fuel evaporating from the wall, etc.). Timing is also a factor; both directly for the time taken for ignition and combustion and indirectly where it influences the thermal process during compression (e.g. heat conduction to the walls of the combustion chamber). The time is dependent on the engine speed.

Outer parameters are usually of greater interest as these are often controllable parameters which may be used for controlling the ignition and combustion process. The outer parameters are, for instance, the composition of the fuel, the compression ratio of the engine (both geometrical and effective ratio), the intake air temperature, the intake air pressure and the relative composition of the combustible mixture. The combustible mixture is related to the amount of fuel, the amount of air and residual gases in the combustion chamber. The residual gases are exhaust gases that have been retained from a previous combustion or have been returned (and possibly cooled) using EGR. The combustible mixture is also influenced by the evaporation of fuel in the engine intake conduit during the intake stroke.

In addition to what has been stated above, the use of lean mixtures is also a means for optimizing the efficiency of the engine. At a certain degree of dilution there is an optimum state from an efficiency point of view that decides whether HCCI is preferable over forced spark ignition (SI). In most Otto engines there is an operating area from low to medium engine load where HCCI is more effective. Below this operating area, the combustion process suffers from reduced stability. Above the operating area the combustion is too fast and will cause noise (engine knock) and increased heat losses.

A number of known solutions for controlling engines operated with HCCI are described below. One group of solutions involve controlling the amount of residual gas (exhaust gas remaining in the cylinder after the previous combustion) by controlling the gas exchange. Usually variable valve timing and sometimes variable valve lift is used for this purpose. By closing the exhaust valves early during the exhaust stroke it is possible to capture hot exhaust gases from previous combustion cycles. At the same time, an acceptable efficiency can be achieved by delaying the opening of the intake valves, because the hot residual gases are subjected to a compression and an expansion without additional work (apart from heat losses). In this way the hot residual gases can be used to increase the temperature in the cylinder to enable HCCI in a subsequent combustion. Fuel injection timing can be used as a further control parameter.

As in the above solution, fast thermal management is a thermal effect. In this solution a heat exchanger is used for transferring heat from the exhaust gases to a partial flow of air into the intake conduit of the engine. By means of rapidly actuated throttle valves, a controllable mixture of hot and cold air can be supplied to the air intake in order to achieve a stable HCCI operation.

Engines provided with variable compression ratio (VCR) is a further solution for controlling HCCI, provided that the compression ratio can be controlled for each individual cylinder. The compression ratio can be used for controlling both pressure and temperature in the cylinder, but the problem is how to control the compression ratio for each individual cylinder.

Practical applications using HCCI can only be found in a very limited number and those being produced to date can only be operated under very limited operating conditions with respect to engine speeds and torque. Outside the operating conditions suitable for HCCI operation conventional spark ignition operation is used. Due to the problems discussed above and additional problems relating to the control of switching between HCCI and SI operation, most HCCI engines are still at the research or prototype stage.

Hence there is a need for an improved HCCI engine that can solve the problems indicated above.

BRIEF DESCRIPTION

The above problems are solved by a method for controlling an engine according to the appended claims.

The method according to the invention can be applied to a variable compression internal combustion engine of the type described in U.S. Pat. No. 5,188,066, which is hereby incorporated by reference. This document describes an internal combustion engine of the kind which has a number of working cylinders and a corresponding number of auxiliary cylinders, each of which communicates with an associated working cylinder. A piston is arranged in each working cylinder to execute a reciprocating motion inside the working cylinder. The working piston is operatively connected to a first crankshaft via a connecting rod. An auxiliary piston is arranged in each auxiliary cylinder to execute a reciprocating motion inside the auxiliary cylinder. The auxiliary piston is operatively connected to a second crankshaft. A device acting between the first and second crankshafts ensures that the reciprocating motion of the auxiliary piston occurs at a frequency related to the frequency of the reciprocating motion of the working piston. The device is arranged to provide an angular displacement between the crankshafts in order to achieve a predetermined compression ratio in the respective working cylinders and auxiliary cylinders, which ratio is dependent upon the loading on the engine at any given time. U.S. Pat. No. 5,188,066 shows the auxiliary cylinders located in the cylinder head, but it is also possible to locate said cylinders in the engine block, parallel to the main, working cylinders.

A property of this engine, in addition to a variable compression ratio, is that the amount of residual gas is variable. The compression ratio and the residual gas volume can be controlled in the same direction by a single engine parameter. Hence, a high compression ratio is associated with a high amount of residual gas, and vice versa. This property is advantageous for HCCI operation, in particular when it is desired to switch between HCCI operation and SI operation. When switching from SI to HCCI operation, the compression ratio is increased together with the amount of residual gas. Similarly, the compression ratio and the amount of residual gas are decreased when switching from HCCI to SI operation.

A switch from SI to HCCI operation results in a thermal influence on the air/fuel mixture, which mixture can be forced to combust spontaneously in three ways; by an increase in pressure, an increase in temperature caused by increased compression and/or by an added amount of residual gas. The conditions may also be influenced by an increased pressure level in the air intake as the amount of throttling is reduced. During the transition to HCCI operation it is desired to dilute the air/fuel mixture by adding more air or recirculated exhaust gas, which may cause an increased intake air pressure. An increase of the intake air pressure will cause an increased pressure level after the compression stroke, which will contribute towards autoignition of the air/fuel mixture.

A variable compression internal combustion engine as described above is suitable for handling large variations or disturbances in the operation conditions, such as switching all cylinders between SI and HCCI. In order to handle local variations or disturbances in the operating conditions, such as cylinder-to-cylinder variations or disturbances, it may be combined with variable valve actuation (VVA) (shown schematically in FIG. 1, but not numbered). The VVA arrangement may involve variable valve timing and/or variable valve lift.

Generally, examples of large variations may be variations or disturbances in the type of fuel, engine load, engine speed, thermal conditions or mode transitions (such as SI to HCCI). Large variations or disturbances may be handled by controlling the compression ratio, the cam timing, the EGR, the thermal management or the throttle (air/fuel ratio), alone or in combination. Small variations or disturbances can be divided into cylinder-to-cylinder variations or disturbances, such as volumetric efficiency, inlet and exhaust pressure pulses or injected fuel variations, and cycle-to-cycle variations, such as turbulence effects in the air intake or the cylinder or variations in fuel preparation. Small variations or disturbances may be controlled by using VVA, dual fuel injection, direct injection, controlled fuel injection timing, controlled fuelling for each cylinder, and controlled EGR for each cylinder or fast thermal management, alone or in combination.

The composition of the fuel may also be used for controlling HCCI. As in other compression ignition engines, such as diesel engines, the decomposition of the fuel is dependent on its component parts. Hence, the ignition timing for HCCI can be controlled by varying the composition of the fuel between each cycle. This can be achieved either by mixing different fuels in the intake conduits (dual fuel injection) of the engine, or by modifying the composition of the fuel prior to or during injection.

The engine described above comprises an engine block, a cylinder head, main and auxiliary crankshafts and pistons, as well as intake and exhaust valves with at least one associated camshaft and a camshaft transmission. The engine according to the invention further comprises a device for regulating the phase angle between the first and the second crankshaft of the internal combustion engine. A phase shifting device of this type is described in WO 2001/94766, which is hereby incorporated by reference. According to this example, the first and second crankshafts are connected to each other by means of a transmission adapted with the device that includes a crankshaft extension for obtaining the control of the phase angle, the extension being fixed against rotation and displaceably connected to one of the crankshafts and via a grooved portion rotationally connected to the second of the crankshafts. When the crankshaft extension is displaced, rotation is obtained in the grooved portion that results in a corresponding phase angle shift between the crankshafts.

In this description, any references to an internal combustion engine are intended to relate to a four-stroke Otto engine, unless stated otherwise. An engine of this type may have one or more intake and exhaust valves, although the description may only refer to one valve of each type. As stated above the second crankshaft and its associated auxiliary cylinder or cylinders may be located either in the cylinder head or in the engine block. An advantage of providing the auxiliary cylinders in the cylinder head is that the solution may be implemented on an existing engine block. On the other hand, providing the auxiliary cylinders in the engine block will reduce the complexity of the cylinder head, which must also accommodate intake/exhaust conduits, intake/exhaust valves and at least one camshaft. In particular, the existing cooling system for the working cylinders can be used for the auxiliary cylinders.

The relative sizes of the working pistons and cylinders may be approximately twice the size of the auxiliary pistons and cylinders, although the invention is not limited to these particular proportions. The auxiliary pistons are connected to their common second crankshaft, which will have a nominal rotational speed equal to half that of the first crankshaft which is acting as the drive shaft of the engine. The first and second crankshafts may be synchronized by a phase shifting device.

As indicated above, the claimed invention relates to a method for operating an internal combustion engine provided with at least one working cylinder each with an associated auxiliary cylinder in communication with the associated working cylinder, which engine is operable in both spark ignition and compression ignition modes. Each working cylinder comprises a working piston operatively connected to a first crankshaft, which working piston is arranged to execute a reciprocating motion inside the working cylinder, at least one inlet valve for admitting gas including fresh air into said cylinder, and at least one exhaust valve for exhausting combusted gases from said cylinder. Each auxiliary cylinder comprises an auxiliary piston operatively connected to a second crankshaft, which auxiliary piston is arranged to execute a reciprocating motion inside the auxiliary cylinder. The first crankshaft is operatively connected to the second crankshaft to drive the second crankshaft at half the rotational speed of the first crankshaft, and where the operative connection between the crankshafts is provided with a device for phase shift control and arranged to control the phase angle between the first and second crankshafts. The method involves the following steps performed simultaneously for all working and auxiliary cylinders when switching from spark ignition to compression ignition mode:

controlling the phase shift device in order to retain residual exhaust gas and increase the compression ratio, determining a current combustion phasing timing, and correcting the combustion phasing timing by increasing or decreasing the phase angle to achieve a desired combustion phasing timing.

As stated above, the auxiliary pistons connected to the second crankshaft which is rotated at half the speed of the first crankshaft, but with an adjustable synchronization relative to said first crankshaft. This adjustable synchronization is achieved by means of a phase shifting device.

When a working piston has reached its TDC, the corresponding auxiliary piston has already passed its TDC and the second crankshaft has been rotated a certain angle relative to its TDC position. This angle is referred to as a phase angle ($\theta$). The phase angle can be varied +/−180° relative to the said TDC position, provided that there is no interference between the auxiliary piston and the piston or valves of the working cylinder. Hence, the phase angle is an indication of the synchronization of the second crankshaft relative to the first crankshaft.

The phase angle can be used to control the compression ratio, the expansion ratio and the volume contained in the working and auxiliary cylinders at TDC during gas exchange. The volume of residual gas is proportional to the latter volume and in this way the phase angle can be used to control the amount residual exhaust gas.

By controlling the phase shift device to reduce the phase angle during the transition to compression ignition mode, the amount residual exhaust gas can be increased. Simultaneously the compression ratio is increased and a suitable condition for HCCI is created in the working cylinders. After determining a current combustion phasing, a correction of the combustion phasing towards a desired value may be carried out by selecting a phase angle value from a matrix dependent on current engine load and speed. The phase shift device may be controlled to reduce the phase angle from an initial value of about 120°, suitable for SI operation, to a value below approximately 45°, suitable for HCCI operation. These values of phase angle are mentioned as examples only. The phase angle may vary, not only depending on operating mode but also on engine load, combustion stability and other internal and/or external variations or disturbances.

This initial switching from spark ignition to compression ignition mode is carried out simultaneously for all working and auxiliary cylinders. Large variations in the operation conditions, such as switching all working cylinders between SI and HCCI, can be handled by controlling the phase angle. Once this initial switching has been carried out, there may be local variations in combustion phasing between the working cylinders. Consequently the following steps may be performed for each individual working cylinder when switching from spark ignition to compression ignition mode:

controlling the exhaust and intake valves (illustrated but not numbered in FIG. 1) to perform a negative valve overlap in order to retain residual exhaust gas, determining a current combustion phasing timing, and correcting the combustion phasing by increasing the retained residual exhaust gas fraction by stepwise control of a combustion related parameter.

These steps for correcting local variations in the combustion phasing in individual cylinders may be combined with and carried out simultaneously as the steps for correcting large variations of the combustion phasing in all cylinders using the phase angle.

Combustion phasing control for each individual working cylinder can involve controlling the intake/exhaust valve timing to increase the residual gas fraction. Additional control of the residual gas fraction may involve increasing the exhaust manifold gas pressure, for instance by controlling a turbocharger wastegate or by selecting exhaust valve closing timing to use exhaust pressure pulses.

Additional combustion phasing control for each individual working cylinder can involve correcting the combustion phasing by a stepwise decrease of intake air amount. This may be achieved by controlling the valve timing to decrease the intake air amount and/or by reducing intake manifold air pressure, for instance by restricting an intake throttle and/or by controlling an intake air charging unit.

Further combustion phasing control for each individual working cylinder can involve correcting the temperature in the combustion chamber by a stepwise increase of negative valve overlap. This may be achieved by advancing exhaust valve closing timing to increase the negative valve overlap and/or by retarding intake valve opening to increase the negative valve overlap.

Finally, combustion phasing control for each individual working cylinder may be carried out by determining a current combustion phasing timing, and correcting the combustion phasing by controlling the amount of injected fuel. This may be achieved by advancing the combustion phasing by reducing the amount of injected fuel, or by correcting the combustion phasing by controlling the composition of the injected fuel.

HCCI is complex to control by its nature and it is desirable to achieve stable operating conditions in order to provide a robust engine with good driveability. Because many applications, such as automobiles, can have variable operating conditions, an example of an application using HCCI may be a hybrid vehicle where electric power can be used for transient loads.

BRIEF DESCRIPTION OF THE FIGURES

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

DETAILED DESCRIPTION OF VARIOUS EMBODIMENTS

Figure 1:
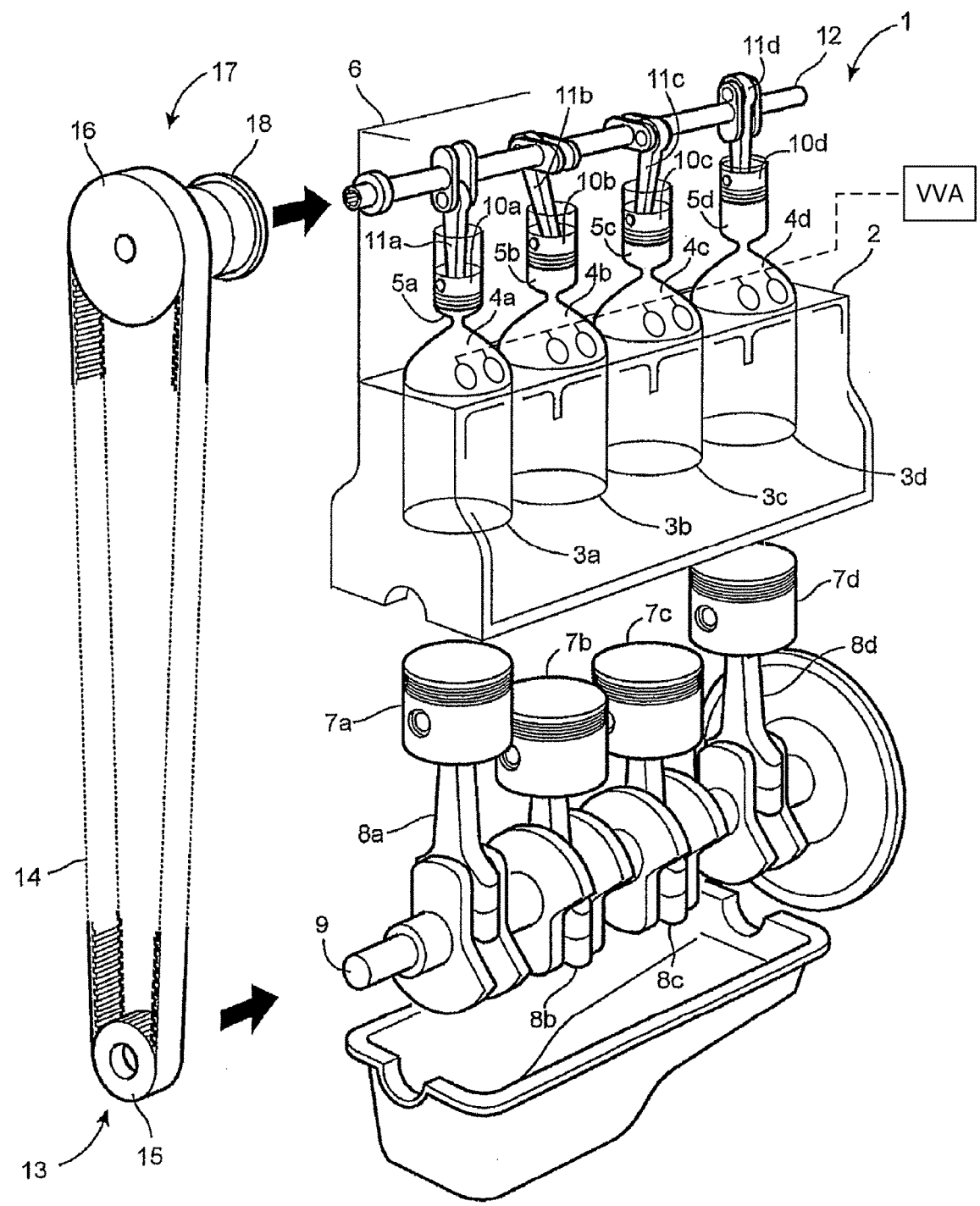
FIG. 1 shows an exploded perspective view of a four-cylinder engine with an arrangement that may be used in the present invention.

FIG. 1 shows an exploded perspective view of a four-cylinder engine arrangement 1 used in one example of the present invention. The engine 1 according to the example in FIG. 1 exhibits an engine block 2 four working cylinders 3a, 3b, 3c, 3d, each of which communicates via channels 4a, 4b, 4c, 4d with a corresponding auxiliary cylinder 5a, 5b, 5c, 5d arranged in a cylinder head. In each of the working cylinders 3a, 3b, 3c, 3d, and similarly in the auxiliary cylinders 5a, 5b, 5c, 5d, working pistons 7a, 7b, 7c, 7d and auxiliary pistons 10a, 10b, 10c, 10d are able to execute reciprocating axial motion. The working pistons are arranged to move between an upper position, or top dead centre (TDC), adjacent the intake and exhaust valves, and a lower position, or bottom dead centre (BDC), remote from the intake and exhaust valves. When a working piston is in its TDC position, the volume of the working combustion chamber has its minimum value. The working pistons 7a, 7b, 7c, 7d are operatively connected via connecting rods 8a, 8b, 8c, 8d to a working crankshaft 9. The auxiliary pistons 10a, 10b, 10c, 10d are similarly operatively connected via connecting rods 11a, 11b, 11c, 11d to an auxiliary crankshaft 12. The auxiliary pistons are also arranged to move between a TDC position and a BDC position, wherein the TDC position of an auxiliary piston is defined as the position where the volume of the auxiliary combustion chamber has its minimum value. The crankshafts 9, 12 are connected to each other by means of a transmission 13 comprising a toothed driving belt 14 which runs over a first 15 and a second 16 pulley, which transmission is arranged to cause the reciprocating motion of the auxiliary pistons 10a, 10b, 10c, 10d to take place at a frequency related to the reciprocating motion of the working pistons 7a, 7b, 7c, 7d, and cause an angular displacement between the crankshafts 9, 12, such as to produce in the working cylinders and in the auxiliary cylinders a compression ratio which is dependent on the loading on the engine at any given time. In the case of a four-stroke engine, the frequency of the reciprocating motion of the auxiliary pistons is one half of the frequency of the working pistons. In the case of a two-stroke engine, the aforementioned frequencies are identical. The engine arrangement is now explained below in more detail in relation to a four-stroke engine application, with reference to the drawings.

The dependence referred to above is in this case such that the compression ratio is at its lowest under high loading, and at its highest under low loading, that is to say the respective positions of the working pistons and the auxiliary pistons at the moment of ignition are closest to one another under low load and are furthest away from one another under high load. The cycle of the working piston 7a comprises the induction, compression, power and exhaust strokes, during which strokes the working piston 7a moves, in sequence, down to its BDC, up to its TDC, down to its BDC and up to its TDC. During the same time period the associated auxiliary piston 5a moves to its TDC both during parts of the induction stroke and during the compression and expansion strokes. As will be appreciated from the following text, this is achieved by means of an operative connection of the kind referred to by way of introduction between the auxiliary piston and the second crankshaft 12, which connection permits the expansion motion of the auxiliary piston 5a, that is to say its upward motion during the induction stroke of the working piston, to extend over more than 180° of the rotation of the second crankshaft 12.

A characteristic feature of the engine arrangement is that the aforementioned devices acting between the crankshafts are able to transmit energy originating from the effect of the combustion on the respective auxiliary piston 10a, 10b, 10c, 10d, from the crankshaft 12 to the crankshaft 9. This transmission of energy is effective in particular in the low load range of the engine and contributes to an improved degree of efficiency relative to previously disclosed engines.

The reason why this transmission of energy from the effect of combustion on the auxiliary pistons to the crankshaft 9 contributes in such a particularly effective manner to the high degree of efficiency of the four-stroke engine is that the auxiliary pistons move at a comparatively low speed, which in itself leads to low frictional losses. Compared with the working pistons, the auxiliary pistons take energy from the combustion process during a much larger proportion of the cycle of the engine than is the case for the working pistons. The reduced induction and compression work and the lower maximum combustion temperature also contribute to lower losses in both four-stroke and two-stroke engines. It was thus possible, in a four-stroke test engine as described and at a certain degree of loading, to measure a generated effect on the auxiliary crankshaft 12 as high as approximately ⅓ of the effect generated on the working crankshaft 9, in conjunction with which, however, the frictional losses via the auxiliary crankshaft 12 were only 1/15 of the frictional loss via the working crankshaft 9.

In the embodiment illustrated in the drawings, the aforementioned device consists of a toothed belt 14 which runs around toothed belt pulleys 15, 16 arranged on the crankshafts 9 and 12. The toothed belt pulley 16, in this case for a four-stroke engine, has a diameter which is twice as large as the diameter of the toothed belt pulley 15, in order for the auxiliary pistons 10a, 10b, 10c, 10d to execute their reciprocating motion in the manner described above, that is to say at a frequency which is one half as great as the frequency of the working pistons 7a, 7b, 7c, 7d. In the case of a two-stroke engine the toothed belt pulleys 15, 16 have identical diameters, so that the frequency of the reciprocating motion of both the working pistons and the auxiliary pistons is identical.

In the case where the size of the driving wheels 15, 16 is chosen so that the second crankshaft 12 rotates with half the rotational speed of the first crankshaft 9. The second driving wheels 16 partially envelopes the housing 18 of the device for phase shift control 17, which device is arranged on the cylinder head 6.

Figure 2:
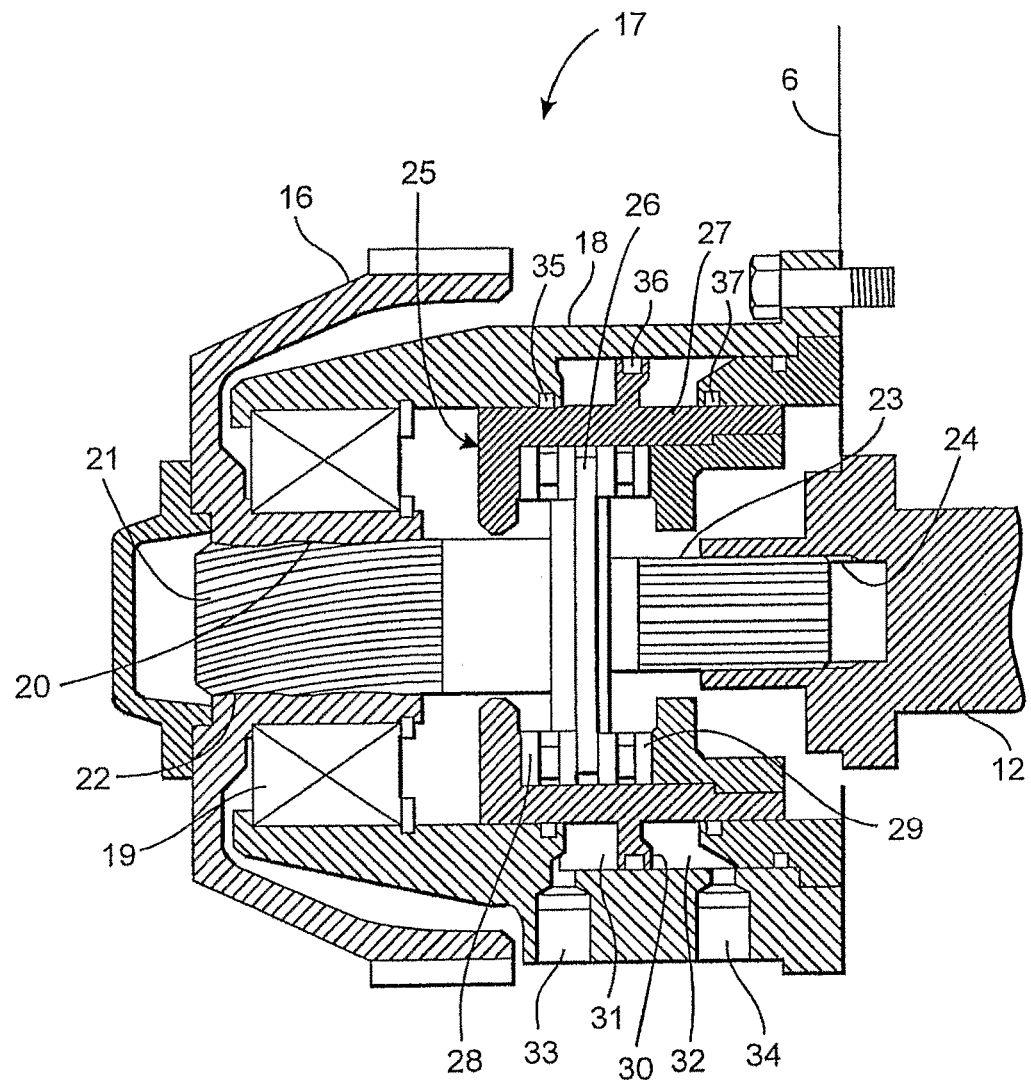
FIG. 2 shows one embodiment of a means for phase shift control for an engine according to FIG. 1.

With reference to FIG. 2, one embodiment of the device or phase shift control 17 will now be described. In the embodiment shown, the second driving wheel 16 is mounted in the housing 18 by means of ball bearings 19, preferably an angle contact layer with double rows. The driving wheel 16 is in addition equipped with a grooved portion 20, which interacts with the corresponding grooved portion 22 on a crankshaft extension 21. Said grooved portions 20, 22 are equipped with grooves of the trapeze groove kind with twelve inlets which afford a shift in angle of 120° at 20 mm axial displacement of the crankshaft extension 21. The crankshaft extension 21 in addition exhibits a portion equipped with splines 23 which cooperates with a corresponding portion 24 equipped with splines on the second crankshaft 12 for said connection which is displaceable and fixed against rotation. The axis of rotation of the crankshaft extension 21 thus coincides with the axis of rotation of the second crankshaft 12.

The crankshaft extension 21 is made of steel and is, at the grooved portion 22 and the portion 23, equipped with splines, covered with a layer consisting of chemically deposited nickel, which has been impregnated and surface coated with a fluoral plastic and thermically hardened. In this way, low friction is obtained, which means that reduced forces will be necessary for said phase shift control. Coatings of this kind, namely that involve a fluoral plastic and are thermically hardened, are commercially available under the brand name Nedox®, and have previously been used, among other things, as surface coating on gear cogs and on moulding tools for plastic products with small trailing angles.

The device 17 in addition comprises means 25 to achieve the displacement of the crankshaft extension 21. For this purpose, the crankshaft extension 21 is thus provided with a flange 26 between said grooved portion 22 and the splined portion 23, on which a hydraulic piston 27 which is displaceably arranged in the housing 18 is arranged to work. Between the flange 26 and the hydraulic piston 27 there are arranged bearings 28, 29 of the needle bearings kind, which are arranged to absorb the axial forces which will arise as a result of the torque transferred over said grooved portions 20, 22. Since the hydraulic piston 27 is arranged to surround the crankshaft extension 21, the arrangement 17 will become compact and short in the axial direction, which is extremely advantageous in motor vehicles.

In addition, the hydraulic piston 27 on its enveloping surface exhibits an abutment 30 which divides a chamber into a first 31 and a second 32 sub-chamber, which each communicate with a first 33 and a second 34 oil conduit, respectively. The oil conduits 33,34 are connected to a not shown hydraulic control valve which, depending on a control system of the engine 1, controls the oil supply to one or the other sub-chamber 31,32, and in so doing causes a phase angle shift between said first 9 and second 12 crankshaft. By using part of the oil which is pressurized by the servo control pump which is usually to be found on the engine 1, there is no need for an extra oil pump.

The housing 18 is additionally provided with o-rings 35, 36, which are arranged to be in contact with the piston 27, one on each side of said abutment 30, and to function as oil sealing for the sub-chambers 31, 32. On the outer perimeter of the abutment 30 there is arranged a corresponding o-ring for oil sealing between said first 31 and second 32 sub-chamber. Since the crankshaft extension 21 is connected to the piston 27 via the bearings 28, 29 there is, in principle, no torque transferred to the piston 27 when the crankshaft extension 21 rotates. As a result of this, the piston 27, due to friction between it and the o-rings 35, 36, 37, will not rotate with the crankshaft extension 21 when it rotates, which simplifies said oil sealing.

According to what has been described above, the function of the device 17 is as follows. Supply of oil through the conduit 33 to the sub-chamber 31 results in a build-up of pressure in the sub-chamber 31, whose volume is limited by the abutment 30 arranged on the piston 27. This in turn causes the piston 27 to be pressed in the direction of the cylinder head 6. Since the crankshaft extension 21 via the bearings 28, 29 is connected to the piston 27, there is thus a relative axial displacement in the spline coupling 23, 24 between the crankshaft extension 21 and the crankshaft 12. At the same time, there is a corresponding relative axial displacement between the crankshaft extension 21 and the second driving wheel 16, while the driving wheel 16 rotates in the trapeze grooves 20, 22, which displacement causes a phase angle shift between the first 9 and the second 12 crankshaft. In a corresponding manner, a shift in phase angle in the opposite direction is obtained when supplying oil through the conduit 34 to the sub-chamber 32.

The device for phase shift control is not limited to that which has been described above, other embodiments are also possible. For example, an electric motor can be arranged to influence the flange of the crankshaft extension instead of said hydraulic piston. Displacement of the crankshaft extension can also take place against a coil, for example a spiral coil, with said hydraulic piston or electric motor only being arranged to cause displacement in one direction. The return movement can then be provided by means of the coil.

According to an alternative embodiment, the crankshaft extension is arranged in the opposite direction, so that said splined coupling can be arranged at the second driving wheel, and said trapeze groove is arranged between the crankshaft extension and the second crankshaft. In yet another alternative embodiment, the device for control of phase angle, in contrast to the above described embodiment, can be arranged at the first crankshaft. Finally, the crankshaft extension can, instead of said splines, be equipped with another cross-section, for example a square cross-section which interacts with a corresponding square hole on the crankshaft for obtaining said displaceable connection which is fixed against rotation.

When a working piston has reached its TDC, the corresponding auxiliary piston has already passed its TDC and the second crankshaft has been rotated a certain angle relative to its TDC position. This angle is referred to as a phase angle ($\theta$). The phase angle can be varied +/−180° relative to the said TDC position, provided that there is no interference between the auxiliary piston and the piston or valves of the working cylinder. Hence, the phase angle is an indication of the synchronization of the second crankshaft relative to the first crankshaft.

The phase angle can be used to control the compression ratio, the expansion ratio and the volume contained in the working and auxiliary cylinders at TDC during gas exchange. The volume of residual gas is proportional to the latter volume and in this way the phase angle can be used to control the amount residual exhaust gas. Controlling the phase angle can also have an effect on the stroke volume.

The following equations may be used to describe the total instantaneous volume in the combustion chambers and cylinders $V_{tot}$, based on the cylinder diameters $D_1$ and $D_2$ and the piston positions $x_1$ and $x_2$ for the working cylinder and auxiliary cylinder respectively, and the minimum volume $V_{min}$ the can occur in the combustion chamber. The piston positions are dependent on the crankshaft angles $\phi_1$ and $\phi_2$ for the first and second crankshafts respectively and the phase angle θ. The piston positions are also determined by a number of geometric parameters, such as crank radius $r_1$, $r_2$, connecting rod length $l_1$, $l_2$ and piston pin offset $\delta_1$, $\delta_2$ for the working cylinder and auxiliary cylinder respectively.

$$x_i = (r_i + l_i) * \cos(\xi_i) - \left[ r_i * \cos(\varphi_i + \xi_i) + \sqrt{l_i^2 - (r_i * \sin(\varphi_i + \xi_i) - \delta_i)^2} \right] \quad (1)$$

$$\xi_i = \arcsin\left(\frac{\delta_i}{r_i + l_i}\right) \quad (2)$$

$$\varphi_2 = \frac{\varphi_1}{2} + \theta \quad (3)$$

$$V_{tot} = x_1 * \frac{\pi * D_1^2}{4} + x_2 * \frac{\pi * D_2^2}{4} + V_{min} \quad (4)$$

For a given engine geometry these equations can be used for determining displaced volume $V_d$, compression ratio $r_c$, expansion ratio $r_e$ and the geometrical volume ratio characterizing the relative amount of residual exhaust gas $V_r$, using the following definitions;

$V_d = (V_{max}$ during intake stroke$) - (V_{min}$ during exhaust stroke$)$ $r_c = (V_{max}$ during intake stroke$)/(V_{min}$ during compression stroke$)$ $r_e = (V_{max}$ during expansion stroke$)/(V_{min}$ during compression stroke$)$ $V_r = (V_{min}$ during exhaust stroke$)/(V_{max}$ during intake stroke$)$ FIGS. 3-5 indicates the above properties for an engine described in connection with a number of examples listed below. Table 1 states the geometric proportions of this engine, which in a 4-cylinder Otto engine would correspond approximately to a 1.8 liter engine. The minimum volume $V_{min}$ is the volume is the volume contained between the working and auxiliary pistons when both pistons are in their TDC positions, which volume is determined by the geometry of the respective cylinders and the shape of the connection there between.

TABLE 1

| Working cylinder | | |
|---|---|---|
| Cylinder bore | $D_1$ | 86 mm |
| Crank radius | $r_1$ | 40 mm |
| Connecting rod length | $l_1$ | 150 mm |
| Piston pin offset | $\delta_1$ | 1 mm |
| Auxiliary cylinder | | |
| Cylinder bore | $D_2$ | 40 mm |
| Crank radius | $r_2$ | 20 mm |
| Connecting rod length | $l_2$ | 100 mm |
| Piston pin offset | $\delta_2$ | 1 mm |
| Minimum volume | $V_{min}$ | 31.61 cm3 |

Figure 3:
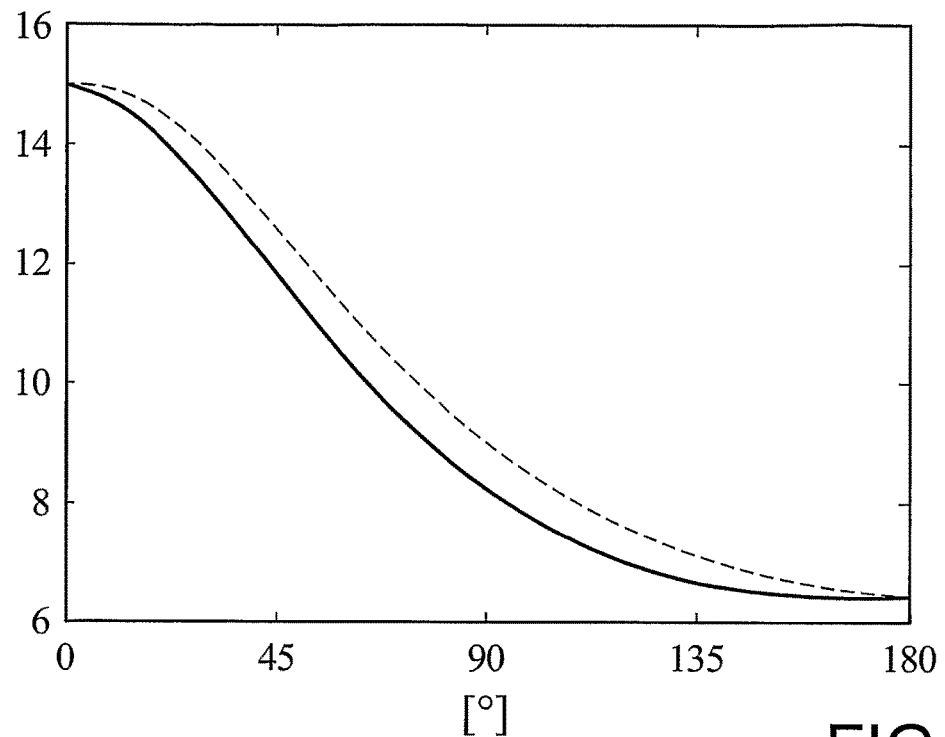
FIG. 3 shows a diagram indicating the compression ratio and expansion ratio for different phase angles.
Figure 4:
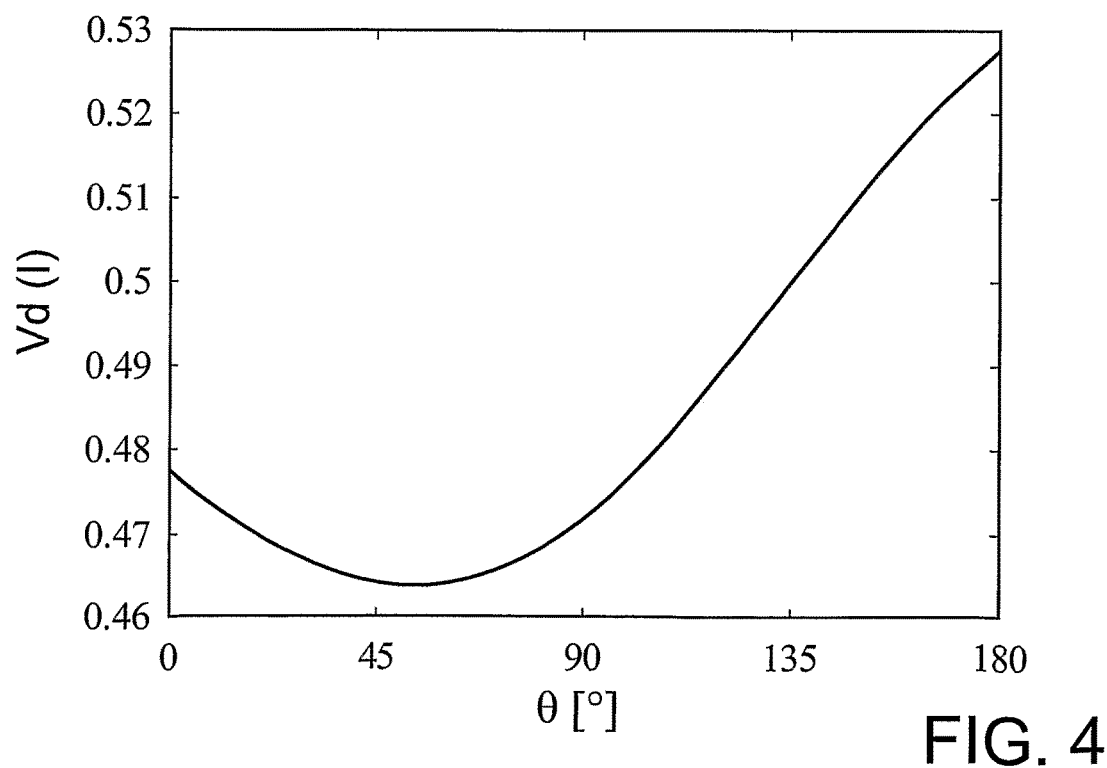
FIG. 4 shows a diagram indicating the change in displaced volume during an intake stroke for different phase angles.
Figure 5:
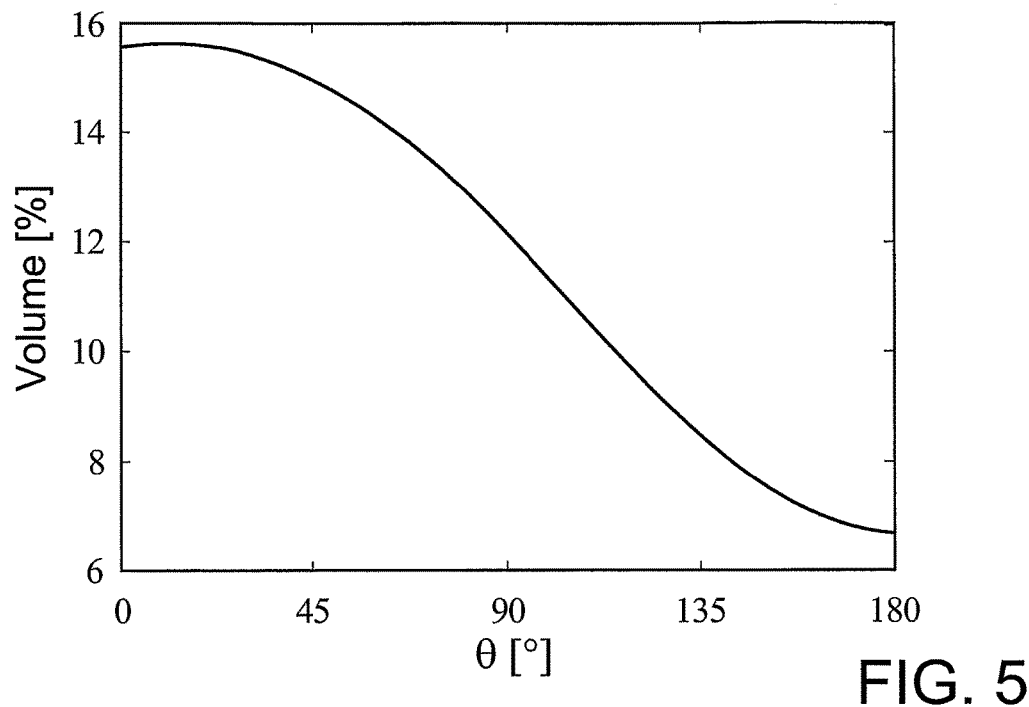
FIG. 5 shows a diagram indicating the residual exhaust gas fraction for different phase angles.

From FIGS. 3-5 it is obvious that the phase angle will have a major impact on both the compression and the expansion ratio. In particular, the expansion ration is of interest because it is significantly higher than the compression ratio, as indicated in FIG. 3. FIG. 3 shows how the compression ratio increases as the phase angle is reduced from 180° towards 0°. Similarly, the expansion ratio decreases as the phase angle is increased from 0° towards 180°. One effect of this relationship is that more energy can be expanded out as work performed by the piston as energy is transferred from the second crankshaft to the first crankshaft. As a result, the efficiency is improved. FIG. 4 indicates the change in displaced volume during an intake stroke for different phase angles. As indicated in FIG. 4, the displaced volume will decrease with a decreased phase angle. However, the displaced volume will have a minimum between 45° and 75° phase angle, before increasing slightly as the phase angle is reduced to 0°. In this example, the minimum displaced volume occurs at a phase angle of about 55°. FIG. 5 shows the impact of the phase angle on the residual exhaust gas fraction, and together with the compression ratio the residual exhaust gas fraction can be used for initiating and controlling HCCI. In the example shown, the residual exhaust gas fraction can be increased from about 7% of the total stroke volume at a phase angle of 180° to over 15% at a phase angle of 0°.

Figure 6:
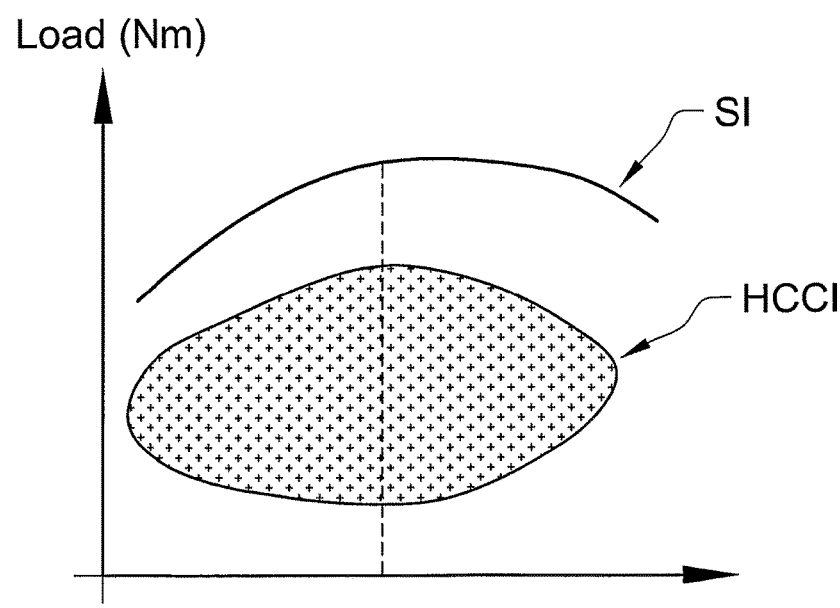
FIG. 6 shows a load vs. engine speed diagram for an engine operable both in SI- and HCCI-mode.

For an engine that can be operated both in SI- and HCCI-mode the operating area for the HCCI-mode is restricted to a limited portion of the load vs. engine speed diagram, as indicated in FIG. 6. The area indicated for HCCI operation is only schematic, as the boundaries between SI operation and HCCI operation can vary with the current engine operating conditions, such as the engine coolant temperature and the ambient air temperature.

Figure 7:
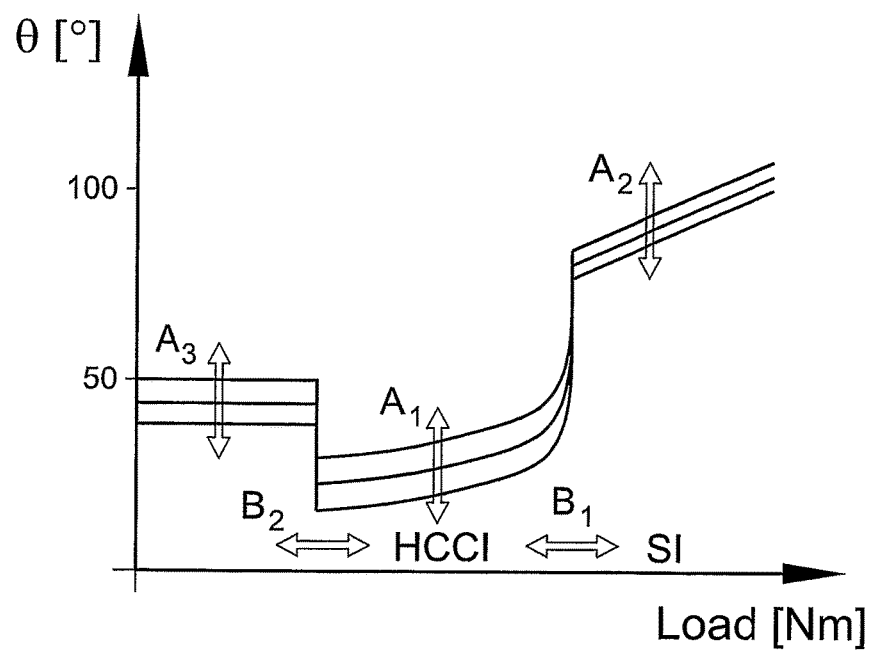
FIG. 7 shows a diagram indicating the relationship between engine load and phase angle.

FIG. 7 shows a diagram indicating the relationship between engine load and phase angle. The diagram contains a HCCI area within which the combustion phasing can be controlled by adjusting the phase angle, as indicated by the arrow $A_1$. HCCI operation can not be used at high engine load, mainly because the combustion will be too fast and the engine will knock. When knock occurs the phase angle is increased and the engine is switched to SI operation, from the HCCI area to the SI area to the right hand side of the diagram in FIG. 6 (see arrow $B_1$). Under such conditions the phase angle and the compression ratio can be controlled during SI operation to reduce the tendency of the engine to knock. The control of the phase angle is indicated by the arrow $A_2$ in the diagram. Engine knock can be caused by local autoignition in edge zones, resulting in pressure oscillations.

If the engine load is too low then the HCCI combustion will become unstable and the engine is switched to SI operation. When this occurs the phase angle is increased and the engine is switched to SI operation, from the HCCI area to the SI area to the left hand side of the diagram in FIG. 6 (see arrow $B_2$). Under such conditions it is not necessary to vary the compression ratio with the engine load during SI operation. Instead a ratio providing a desired combustion stability and efficiency is selected. However, the phase angle may be adjusted as indicated by the arrow $A_3$ in order to maintain a stable combustion during low load SI operation.

As described above, switching between HCCI and SI operation requires not only a phase angle adjustment, but also a change in a number of other parameters, such as throttle position, ignition timing and/or valve timing.

Figure 8:
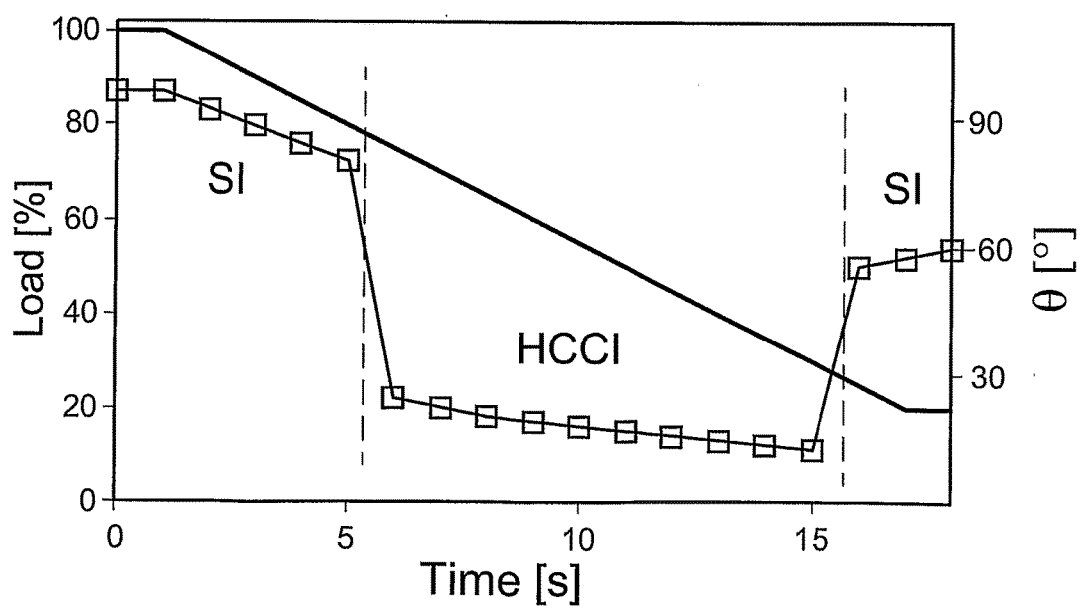
FIG. 8 schematically illustrates how the phase angle can be adjusted as the engine load is decreased.

FIG. 8 schematically illustrates how the phase angle can be adjusted as the engine load is continuously decreased over a period of time. Starting in SI mode (zone 1) and running at an engine load of approximately 100%, the engine load is gradually decreased while the engine speed is maintained constant. When the engine load is reduced to a predetermined limit, a control unit decides that HCCI mode is possible. A switch from SI mode to HCCI mode is performed by reducing the phase angle to initiate the HCCI mode (zone 2). As the engine load continues to drop, the phase angle is reduced until the control unit decides that HCCI mode is no longer possible. A switch from HCCI mode to SI mode is performed by increasing the phase angle to initiate the SI mode (zone 3).

When switching between SI and HCCI operation the compression ratio is increased by reducing the phase angle. The phase angle may for instance by reduced from 180° down to 75°. All working cylinders will then immediately switch to HCCI-mode. However, the current thermal conditions, air/fuel ratio and residual exhaust gas fraction in each individual working cylinder may cause variations in combustion phasing. One definition of the combustion phasing is the crank angle when the combustion has released 50% of the available heat (A50). Variations in the combustion phasing must first be detected and then compensated, preferably using an electronic control unit (ECU) with a closed-loop system. The combustion phasing can be detected in a number of different ways, for instance using a sensor for in-cylinder pressure or a device measuring ion-current. The combustion phasing is then compensated for individual cylinders using VVA, dual fuel injection, direct injection, controlled fuel injection timing, controlled fuelling for each cylinder, and controlled EGR for each cylinder or fast thermal management, alone or in combination. These methods may be used within a limited "window", within which they have a predetermined effect on the combustion phasing. It is desirable to be at or near the centre of this window, in order to enable the system to perform a correction of the combustion phasing in any desired direction.

Example 1

As stated above, the combustion phasing can be controlled by adjusting the amount of injected fuel in each individual working cylinder. An increased injected fuel amount will reduce the delay time and the combustion will occur earlier. Considering a four-cylinder engine being operated in HCCI mode, the amount of injected fuel is ideally 25% of the amount injected during SI mode. If the crank angle when the combustion has released 50% of the available heat (A50) may, for example, occur at crank angle +3°, +5°, −2° and +7° relative to the TDC for each subsequent cylinder, and the desired ideal value is +7°, then there are two possible options.
(1) By lowering the compression ratio a small amount by increasing the phase angle, the combustion phasing for all working cylinders is adjusted by, for instance +4°. This would cause the A50 to occur at crank angles corrected to +7°, +9°, +2° and +11° relative to the TDC for a subsequent combustion in each respective cylinder. The necessary increase of the phase angle can be read from a map stored in an engine control unit.
(2) The first option (1) can be combined with a simultaneous adjustment of the amount of injected fuel in each respective cylinder. By correcting the nominal 25% of the amount of fuel injected during SI mode, each respective cylinder could receive 25%, 26%, 22% and 27%. In combination with the phase angle adjustment, This would cause the A50 to occur at crank angles corrected to +7°, +7°, +6° and +8° relative to the TDC for a subsequent combustion in each respective cylinder. The necessary correction of amount of injected fuel can be read from a map stored in an engine control unit.

Example 2

This example relates to FIG. 8 and can be related to Example 1. The engine is operated at a constant engine speed, but the engine load is being changed over time. As indicated in FIG. 8, the engine load is initially at or near full load (100%) but is reduced continuously to about 20% over a period of approximately 15 seconds. When the engine load has dropped to about 75% the engine is switched from SI mode to HCCI mode. The engine load continues to drop and when the load is reduced to about 25% the engine is switched from HCCI mode to SI mode.

Zone 1

When the engine is operated in SI mode and the engine load is relatively high the compression ratio can be increased, as the risk of knocking is reduced with reduced load. Closed loop combustion control is used for optimizing efficiency and avoiding knock.

Zone 2

During the transition between SI mode and HCCI mode the compression ratio needs to be increased drastically. An increase of the compression ratio will also increase the residual exhaust gas fraction. In HCCI mode the amount of injected fuel supplied to each working cylinder is controlled individually. Closed loop combustion control is used for optimizing the combustion phasing by controlling the phase angle and the amount of injected fuel, as described in Example 1. This allows the efficiency to be increased and the emissions to be decreased.

Zone 3

When the engine load has dropped to about 25% the compression ration can be insufficient to maintain HCCI mode and the combustion may become unstable. The engine control unit will then increase the phase angle and switch the engine from HCCI mode to IS mode. Under low load conditions the compression ratio the compression ratio can be maintained substantially constant. A ratio providing a desired combustion stability and efficiency can be selected from a map stored in the engine control unit.

The invention is not limited to the examples described above, but may be varied freely within the scope of the appended claims.

The invention claimed is:

1. A method comprising the steps of:
operating a four-stroke internal combustion engine with at least one working cylinder with an associated auxiliary cylinder in communication with the at least one working cylinder, the engine being operable in a spark ignition mode and a compression ignition mode, wherein:
A) the at least one working cylinder comprises:
i) a working piston operatively connected to a first crankshaft, the working piston being configured to execute a reciprocating motion inside the working cylinder;
ii) at least one inlet valve for admitting gas including fresh air into said at least one working cylinder; and
iii) at least one exhaust valve for exhausting combusted gases from said at least one working cylinder; and
B) the associated auxiliary cylinder comprises an auxiliary piston operatively connected to a second crankshaft, said auxiliary piston being configured to execute a reciprocating motion inside the associated auxiliary cylinder;

C) the first crankshaft is operatively connected to the second crankshaft to drive the second crankshaft at half the rotational speed of the first crankshaft; and D) the first crankshaft is operatively connected to the second crankshaft through a phase shift controller, wherein the phase shift controller is configured to control a phase angle between the first and second crankshafts;

decreasing the phase angle from a first phase angle, in which the engine is operating in the spark ignition mode, to a second phase angle, in which the engine is operating in the compression ignition mode, wherein as the phase angle decreases, a compression ratio increases;

controlling the phase shift controller in order to increase a retained residual exhaust gas fraction in the associated auxiliary cylinder during a combustion stroke and a subsequent exhaust stroke of the working piston when the engine is operating in the compression ignition mode;

determining a current combustion phasing timing; and correcting the current combustion phasing timing to a desired combustion phasing timing by increasing or decreasing the phase angle.

2. The method according to claim 1, wherein the phase shift controller decreases the phase angle to increase the residual exhaust gas fraction during the transition to the compression ignition mode from the spark ignition mode.

3. The method according to claim 1, wherein correcting the combustion phasing timing comprises selecting a phase angle value from a matrix dependent on current engine load and speed.

4. The method according to claim 1, wherein the at least one working cylinder is a plurality of working cylinders, each working cylinder comprising a working piston and each in communication with an associated auxiliary cylinder, and wherein correcting the combustion phasing timing comprises controlling the phase angle for each of the plurality of working pistons and further comprising controlling at least one further engine related parameter for each individual working cylinder when the engine is in the compression ignition mode.

5. The method according to claim 1, further comprising, during or after switching from the spark ignition mode to the compression ignition mode, controlling the at least one exhaust valve and the at least one inlet valve to perform a negative valve overlap in order to retain residual exhaust gas, and wherein correcting the combustion phasing timing comprises increasing a retained residual exhaust gas fraction by stepwise control of a combustion related parameter.

6. The method according to claim 5, further comprising controlling a valve timing to increase the retained residual exhaust gas fraction.

7. The method according to claim 6, further comprising increasing an exhaust manifold gas pressure.

8. The method according to claim 5, wherein correcting the combustion phasing timing comprises a stepwise decrease of an intake air amount.

9. The method according to claim 8, further comprising controlling a valve timing to decrease the intake air amount.

10. The method according to claim 8, further comprising reducing an intake manifold air pressure.

11. The method according to claim 5, further comprising correcting a temperature by a stepwise increase of the negative valve overlap.

12. The method according to claim 11, further comprising advancing a closing timing of the at least one exhaust valve to increase the negative valve overlap.

13. The method according to claim 11, further comprising retarding an opening timing of the at least one inlet valve to increase the negative valve overlap.

14. The method according to claim 1, wherein correcting the combustion phasing timing comprises controlling an amount of injected fuel.

15. The method according to claim 14, wherein correcting the combustion phasing further comprises controlling the composition of the injected fuel.

16. The method according to claim 7, wherein increasing the exhaust manifold gas pressure comprises controlling a turbocharger wastegate.

17. The method according to claim 7, wherein increasing the exhaust manifold gas pressure comprises controlling a closing timing of the at least one exhaust valve to generate an exhaust pressure pulse.

18. The method according to claim 10, wherein reducing the intake manifold air pressure comprises at least one of restricting an intake throttle or controlling an intake air charging unit.

* * * * *